US012685270B2

(12) United States Patent
Peterson et al.

(10) Patent No.: US 12,685,270 B2
(45) Date of Patent: Jul. 21, 2026

(54) SYSTEMS AND METHODS FOR RAISING A CART IN A MODULAR GROW TOWER

(71) Applicant: Tavaci Technologies LLC, Alpine, UT (US)

(72) Inventors: Sean R. Peterson, Payson, UT (US); Johndavid Tueller, Orem, UT (US); Todd Garrett Tueller, Alpine, UT (US); Ryan Joseph Crawford, Salem, UT (US)

(73) Assignee: Tavaci Technologies LLC, Alpine, UT (US)

( * ) Notice: Subject to any disclaimer, the term of this patent is extended or adjusted under 35 U.S.C. 154(b) by 62 days.

(21) Appl. No.: 18/765,045

(22) Filed: Jul. 5, 2024

(65) Prior Publication Data

US 2025/0008880 A1 Jan. 9, 2025

Related U.S. Application Data

(60) Provisional application No. 63/512,132, filed on Jul. 6, 2023, provisional application No. 63/512,129, filed on Jul. 6, 2023.

(51) Int. Cl.
*A01G 9/14* (2006.01)
*B65G 1/06* (2006.01)

(52) U.S. Cl.
CPC .............. *A01G 9/143* (2013.01); *B65G 1/06* (2013.01)

(58) Field of Classification Search
CPC ...... A01G 9/143; A01G 18/70; A01G 9/0299; A01G 9/088
See application file for complete search history.

(56) References Cited

U.S. PATENT DOCUMENTS 5,567,103 A 10/1996 Konstant
5,822,920 A 10/1998 Tsay
(Continued)

FOREIGN PATENT DOCUMENTS

CN 209310900 U 8/2019
CN 212164498 U 12/2020
(Continued)

OTHER PUBLICATIONS

International Search Report and Written Opinion mailed on Sep. 23, 2024 for PCT Patent Application No. PCT/US2024/036958.

*Primary Examiner* — Magdalena Topolski
(74) *Attorney, Agent, or Firm* — Thomas | Horstemeyer, LLP

(57) ABSTRACT

The present disclosure presents systems and related methods for raising a cart in a modular grow tower assembly. One such system comprises a modular grow tower assembly including a plurality of body frames and a plurality of lift frames. The body frames are configured to support a plurality of carts moving along a path from a top end to a bottom end of the modular grow tower assembly. A harvest frame is positioned adjacent to one of the lift frames. A raising lift mechanism is configured to pull a cart from the modular grow tower assembly into the harvest frame. The raising lift mechanism comprises fork members that are configured to engage wheels of the cart. The raising lift mechanism is further configured to move vertically within the harvest frame to position the cart for subsequent harvesting and reinsertion into the modular grow tower assembly.

5 Claims, 16 Drawing Sheets

(56) References Cited

U.S. PATENT DOCUMENTS

| | | | | |
|---|---|---|---|---|
| 8,627,598 | B1 * | 1/2014 | Souder | A01G 31/06 |
| | | | | 47/60 |
| 9,908,713 | B2 | 3/2018 | Okazaki et al. | |
| 10,306,847 | B2 | 6/2019 | Whitcher et al. | |
| 11,724,876 | B2 * | 8/2023 | Lawrence | B65G 1/0407 |
| | | | | 414/280 |
| 2002/0046696 | A1 | 4/2002 | Lang | |
| 2003/0116068 | A1 | 6/2003 | Sauder et al. | |
| 2006/0037520 | A1 | 2/2006 | Tsing | |
| 2006/0278726 | A1 | 12/2006 | Holly | |
| 2011/0271887 | A1 | 11/2011 | Shoup | |
| 2018/0235156 | A1 | 8/2018 | Blair et al. | |
| 2018/0305123 | A1 | 10/2018 | Lert et al. | |
| 2018/0359948 | A1 | 12/2018 | Millar et al. | |
| 2019/0208722 | A1 | 7/2019 | Fevre et al. | |
| 2020/0037524 | A1 | 2/2020 | Friedman | |
| 2020/0039755 | A1 | 2/2020 | Millar et al. | |
| 2020/0154647 | A1 | 5/2020 | Millar et al. | |
| 2020/0236883 | A1 | 7/2020 | Ambrosi et al. | |
| 2021/0007301 | A1 | 1/2021 | Do | |
| 2022/0009715 | A1 | 1/2022 | Rongley | |
| 2022/0201926 | A1 | 6/2022 | Bertram et al. | |
| 2022/0221328 | A1 | 7/2022 | Coffin | |
| 2022/0256790 | A1 | 8/2022 | Kaplita et al. | |
| 2022/0354070 | A1 * | 11/2022 | Glibetic | A01G 18/62 |

FOREIGN PATENT DOCUMENTS

| | | | | |
|---|---|---|---|---|
| CN | 112806186 | A | 5/2021 | |
| IL | 290012 | B1 | 6/2023 | |
| JP | 2000209970 | A * | 8/2000 | A01G 9/143 |
| JP | 3174418 | U | 3/2012 | |
| KR | 100850684 | B1 | 8/2008 | |
| KR | 101849161 | B1 | 4/2018 | |
| KR | 102514289 | B1 | 3/2023 | |
| WO | 2014182600 | A1 | 11/2014 | |
| WO | WO-2022084516 | A1 * | 4/2022 | B25J 5/007 |
| WO | 2022241505 | A1 | 11/2022 | |
| WO | 2022242531 | A1 | 11/2022 | |

* cited by examiner

SYSTEMS AND METHODS FOR RAISING A CART IN A MODULAR GROW TOWER

CROSS-REFERENCE TO RELATED APPLICATION

This application claims priority to U.S. provisional application entitled, "Systems and Methods for Raising a Cart in an Assembly Line Grow Pod," having application No. 63/512,132, filed Jul. 6, 2023, and U.S. provisional application entitled, "Systems and Methods for Providing a Modular Grow Pod," having application No. 63/512,129, filed Jul. 6, 2023, each of which is entirely incorporated herein by reference.

TECHNICAL FIELD

Embodiments described herein generally relate to systems and methods for raising a cart in a modular grow tower assembly and, more specifically, to a raising lift mechanism for raising a cart in a modular grow tower assembly.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, pets, and livestock, other countries and future populations may not have enough farmland to provide the appropriate amount of crops for these purposes.

SUMMARY

Embodiments of the present disclosure present systems and related methods for raising a cart in a modular grow tower assembly. One such system comprises a modular grow tower assembly including a plurality of body frames and a plurality of lift frames. In various embodiments, the body frames are configured to support a plurality of carts moving along a path from a top end to a bottom end of the modular grow tower assembly. The system can further include a harvest frame positioned adjacent to one of the lift frames, where the harvest frame includes a rectangular base frame, vertical supports, and a top support; and a raising lift mechanism configured to pull a cart from the modular grow tower assembly into the harvest frame, where the raising lift mechanism comprises a base frame, a rail with fork members, and rollers, such that the rail is rotatably and longitudinally movable between an extended position and a retracted position, and the fork members are configured to engage wheels of the cart. In various embodiments, the raising lift mechanism is further configured to move vertically within the harvest frame to position the cart for subsequent harvesting, sanitizing, seeding, and reinsertion into the modular grow tower assembly.

Embodiments of the present disclosure also include a method comprising providing a modular grow tower assembly with a plurality of body frames and lift frames, the body frames supporting a plurality of carts moving in a path; positioning a harvest frame adjacent to a lift frame at a termination point of the path; using a raising lift mechanism to pull a cart from the lift frame into the harvest frame, the raising lift mechanism comprising a base frame, a rotatable and longitudinally movable rail, and fork members to engage the cart; moving the raising lift mechanism vertically to position the cart for harvesting, sanitizing, and seeding processes; and/or reinserting the cart into the modular grow tower assembly after the seeding process.

Embodiments of the present disclosure also include a raising lift mechanism for use in a modular grow tower assembly. Such an apparatus comprises a base frame; a rail having a first end and a second end, where each end includes fork members configured to engage wheels of a cart and/or rollers on the fork members configured to interact with a guide in a harvest frame at a termination point of a movement path of the cart. In various embodiments, the rail is rotatably mounted to the base frame and is configured to move longitudinally between an extended position, for engaging a cart, and a retracted position, for pulling the cart into the harvest frame. In various embodiments, the raising lift mechanism is further configured to move vertically within the harvest frame to facilitate harvesting, sanitizing, seeding, and reinsertion of the cart into the modular grow tower assembly.

In one or more aspects for modular grow tower systems and related methods and apparatuses, the raising lift mechanism is configured to rotate about a z-axis to overturn the cart for harvesting, sanitizing, and/or seeding; the path comprises a serpentine path; the fork members include a first fork and a second fork configured to securely hold the wheels of the cart during vertical movement; and/or the rollers on the fork members are configured to engage guides in the harvest frame to control a rotational movement of the rail.

In one or more aspects, such systems, methods, and/or apparatuses of the present disclosure can involve or comprise a harvesting component with a tray rotatably mounted within the harvest frame, the tray being positionable between a receiving position and a harvesting position; a controller configured to detect if crop materials in the cart are ready for harvesting and adjusting movement of the cart and/or lighting, watering, nutrient delivery, and/or growth conditions of the crop material based on the detected readiness; detecting, by a controller, if crop materials in the cart are ready for harvesting and adjusting movement of the cart and/or lighting, watering, nutrient delivery, and/or other growth conditions of the crop material based on the detected readiness; harvesting the cart by removing crop materials from the cart; sanitizing the cart after harvesting is performed; and/or reseeding the cart after the crop materials are removed.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for raising a cart in a modular grow tower assembly. The modular grow tower assembly may include a plurality of lift frames and a plurality of body frames positioned between the plurality of lift frames. The plurality of body frames may be configured to support a plurality of carts, which traverse the modular grow tower assembly by following a moving path (e.g., serpentine moving path, circular moving path, curved or straight moving path, etc.). The modular grow tower assembly may further include a harvest frame positioned adjacent to one of the plurality of lift frames. As the plurality of carts finish traversing the modular grow tower assembly, a raising lift mechanism may pull the carts from the modular grow tower assembly and into the harvest frame. The raising lift mechanism may be configured to raise carts through the harvest frame such that the carts may be harvested, sanitized, seeded, and returned to the modular grow tower assembly.

Figure 1:
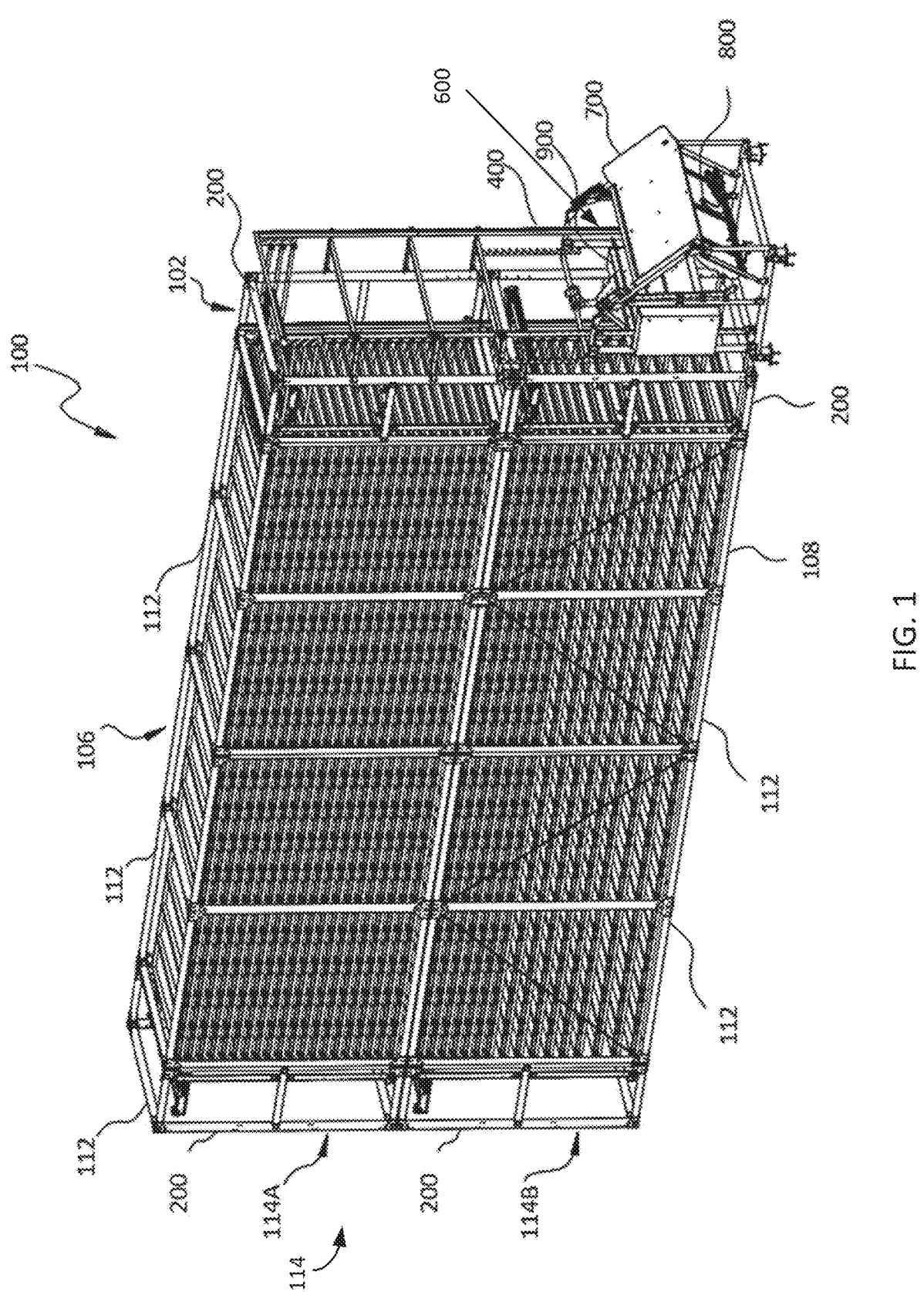
FIG. 1 depicts a perspective view of a modular grow tower assembly according to one or more embodiments shown and described herein.

FIG. 1 provides a modular grow tower assembly 100 of a comprising a plurality of body frames 112 and a plurality of lift frames 200. The plurality of lift frames may be located on a first end 102 and a second end 104 of the modular grow tower assembly 100, and the plurality of body frames 112 may be positioned between the plurality of lift frames 200. In various embodiments, the plurality of body frames may be configured to support a plurality of carts 300 (FIG. 2), which may traverse the modular grow tower assembly 100 in a moving path (e.g., serpentine moving path) from a top end 106 of the modular grow tower assembly 100 to a bottom end 108 of the modular grow tower assembly 100. As illustrated in FIG. 1, the plurality of lift frames 200 and body frames 112 may be stacked in a vertical direction such that the plurality of lift frames 200 and body frames 112 to create a plurality of rows 114A, 114B (collectively referred to as 114).

In various embodiments, the modular grow tower assembly and constituent lift frames and body frames can comprises a variety of materials, such as, but not limited to, aluminum alloys, titanium alloys, carbon fiber reinforced polymer (CFRP), glass fiber reinforced polymer (GFRP), high-strength low-alloy (HSLA) steel, stainless steel, bamboo, composite materials (hybrid), engineered wood products (e.g., cross-laminated timber (CLT)), high-strength thermoplastics (e.g., polycarbonate, polyether ether ketone (PEEK)).

In various embodiments, the moving path may take various shapes. For example, the moving path may comprise a serpentine path, such as one that starts from the top, moving trays horizontally in one direction, then down one sequential row as they reach the end of the horizontal path. The trays then move in the opposite horizontal direction along the new row, then down another row to continue the same pattern, and so forth. Alternatively, in various embodiments, the moving path may comprise a C-Shape path, such that carts may move horizontally in one direction on the top half of the total rows, then down to the bottom half of the total rows where the lighting system may be located. The carts may then move horizontally in the opposite direction, being harvested at the bottom. Correspondingly, in some embodiments, the moving path may comprise alternating rows/skipping rows path such that carts may move from row A to row C and then, subsequently, carts may move from row B to row D, instead of A to B to C to D in sequence. Further, in various embodiments, the moving path may having batching collections of rows such that groups of rows may be set and left without movement for many days and then all moved to a new set of rows with different heights or systems in one rapid succession. For example, rows A, B, C, and D may be batched to be moved on the same day to rows I, J, K, and L, while rows E, F, G, and H remain stationary until the following day. Additionally, in various embodiments, the moving path may comprise a haphazard path such that carts from the top rows can be moved down to any of the lower rows where different systems such as nutrients, lighting, watering, and measuring are located, and then moved back up again to the same row of origin or another row, offering full versatility.

Figure 2:
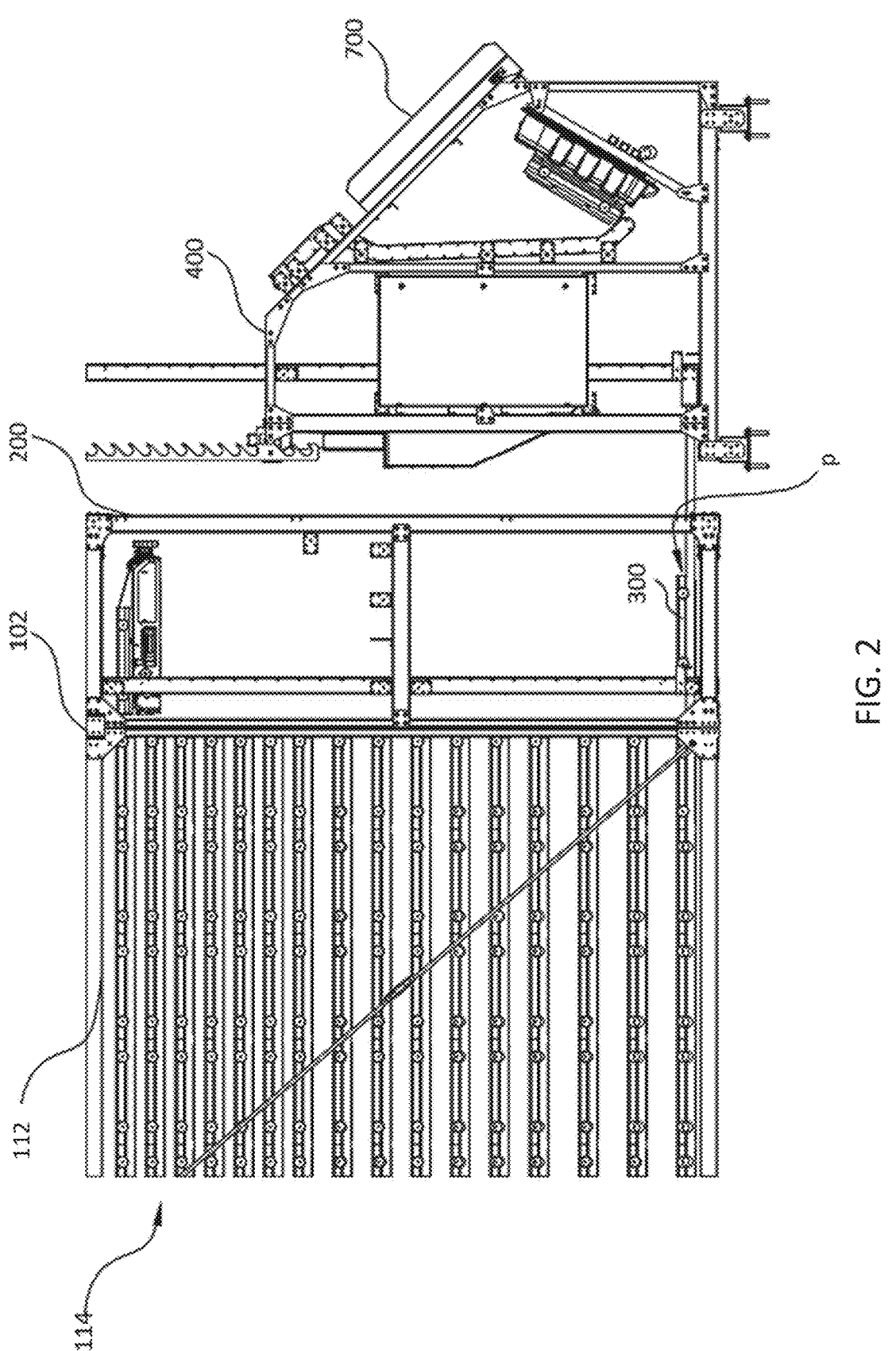
FIG. 2 depicts a front view of the modular grow tower assembly of FIG. 1 illustrating a cart in a transfer position according to one or more embodiments described herein.

Referring now to FIG. 2, the modular grow tower assembly 100 may further include a harvest frame 400 positioned adjacent to one of the plurality of the lift frames 200 on either the first end 102 or the second end 104 of the lowest row 114 of the modular grow tower assembly 100. As the carts 300 traverse the modular grow tower assembly 100, the carts 300 may complete the moving path at a transfer point P which may be located in the lift frame 200 positioned between the harvest frame 400 and body frame 112. For example, as illustrated in FIG. 2, the moving path may terminate at the transfer point P, which may be located in the lift frame 200 positioned adjacent to the harvest frame 400 and body frame 112.

Figure 3:
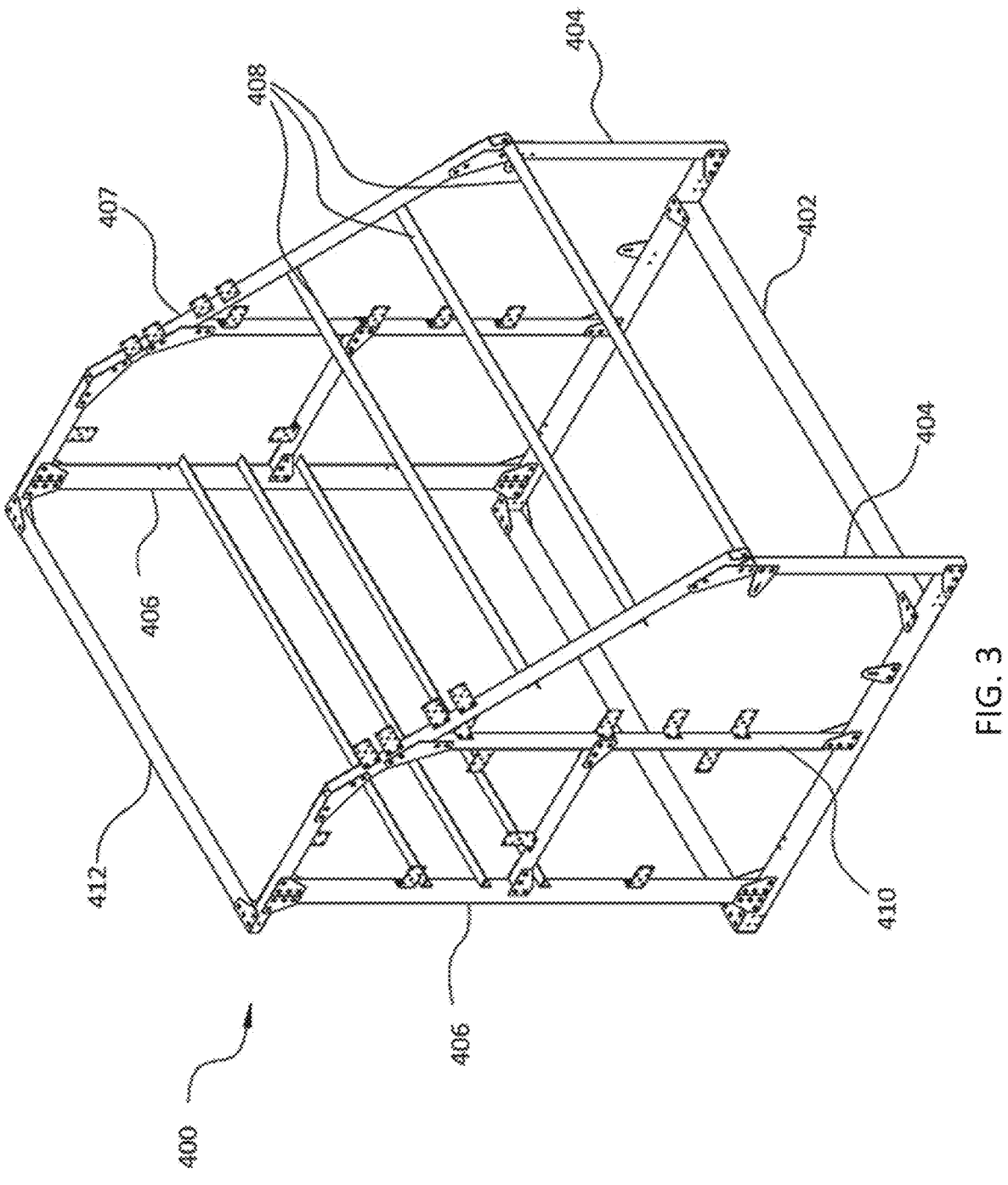
FIG. 3 depicts a harvest frame of the modular grow tower assembly of FIG. 1 according to one or more embodiments shown and described herein.

Turning now to FIG. 3, the harvest frame 400 may include a rectangular base frame 402. First supports 404 and second supports 406 may extend upwardly from the base frame 402, and may be connected via diagonal supports 407. Central supports 410 may also extend upwardly from the base frame 402 such that the central supports intersect the diagonal supports 407. A plurality of cross members 408 may be mounted in parallel between diagonal supports 407. The harvest frame 400 may further include a top support 412, which may connect the second supports 406. In some embodiments, the top support 412 of the harvest frame 400 may be aligned with the top end of the adjacent lift frame 200. The harvest frame may have a height corresponding to a distance between the base frame 402 and the top support 412, a width corresponding to a distance between the first supports 404, and a length corresponding to a distance between the first support 404 and the second support 406.

Referring now to FIGS. 1 and 3, the harvest frame 400 may contain a raising lift mechanism 600, a harvesting component 700, and a sanitation component 800. The raising lift mechanism 600 may be located between the second supports 406 and the central supports 410. The plurality of cross members 408 may be used to support the harvesting component 700, and the sanitation component 800 may be located between the central supports 410 and the first supports 404.

Figure 4:
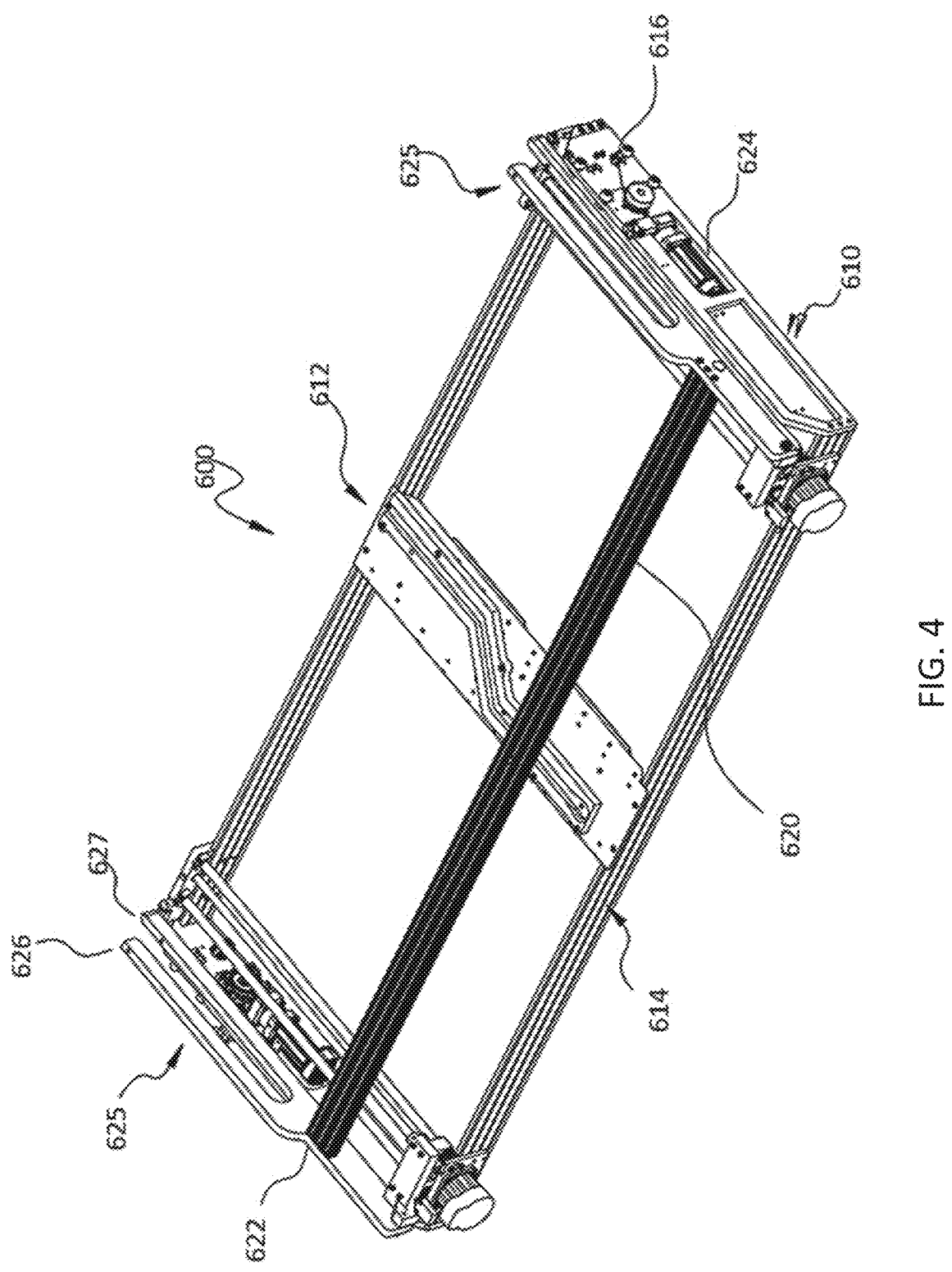
FIG. 4 depicts a raising lift mechanism of the modular grow tower assembly of FIG. 1 according to one or more embodiments described herein.

The raising lift mechanism 600 may be best illustrated in FIG. 4. In some embodiments, the raising lift mechanism 600 may be configured to pull carts 300 from the lift frame 200 located at the end of the moving path and into the harvest frame 400. The raising lift mechanism 600 may be configured to move vertically up and down through the harvest frame 400 between the rectangular base frame 402 and the top support 412. In some embodiments, the raising lift mechanism 600 may be further configured to move in a vertically upward direction beyond the top support 412. As illustrated in FIG. 1, the raising lift mechanism 600 may be configured to rise above the harvest frame 400, such that the raising lift mechanism 600 may interact with the seeding component 900.

Referring still to FIG. 4, the raising lift mechanism 600 may include a base frame 610 and a rail 620 having a first end 622 and a second end 624. The first end 622 and second end 624 of the rail 620 may each include fork members 625, which may include a first fork 626 and a second fork 627. The fork members 625 which may be configured to engage wheels 310 (FIG. 5B) of the carts 300. The fork members 625 may each include a roller 616, which may be configured to interact with the harvesting component 700. The rail 620 may be rotatably mounted to the base frame 610 such that the raising lift mechanism 600 may move between an initial position and a rotated position. In some embodiments, the rail 620 may be configured to rotate about a z-axis. When the fork members 625 are engaged with the wheels 310 of the cart 300, the rail 620 may be configured such that the cart 300 is overturned in the rotated position.

Figure 5A:
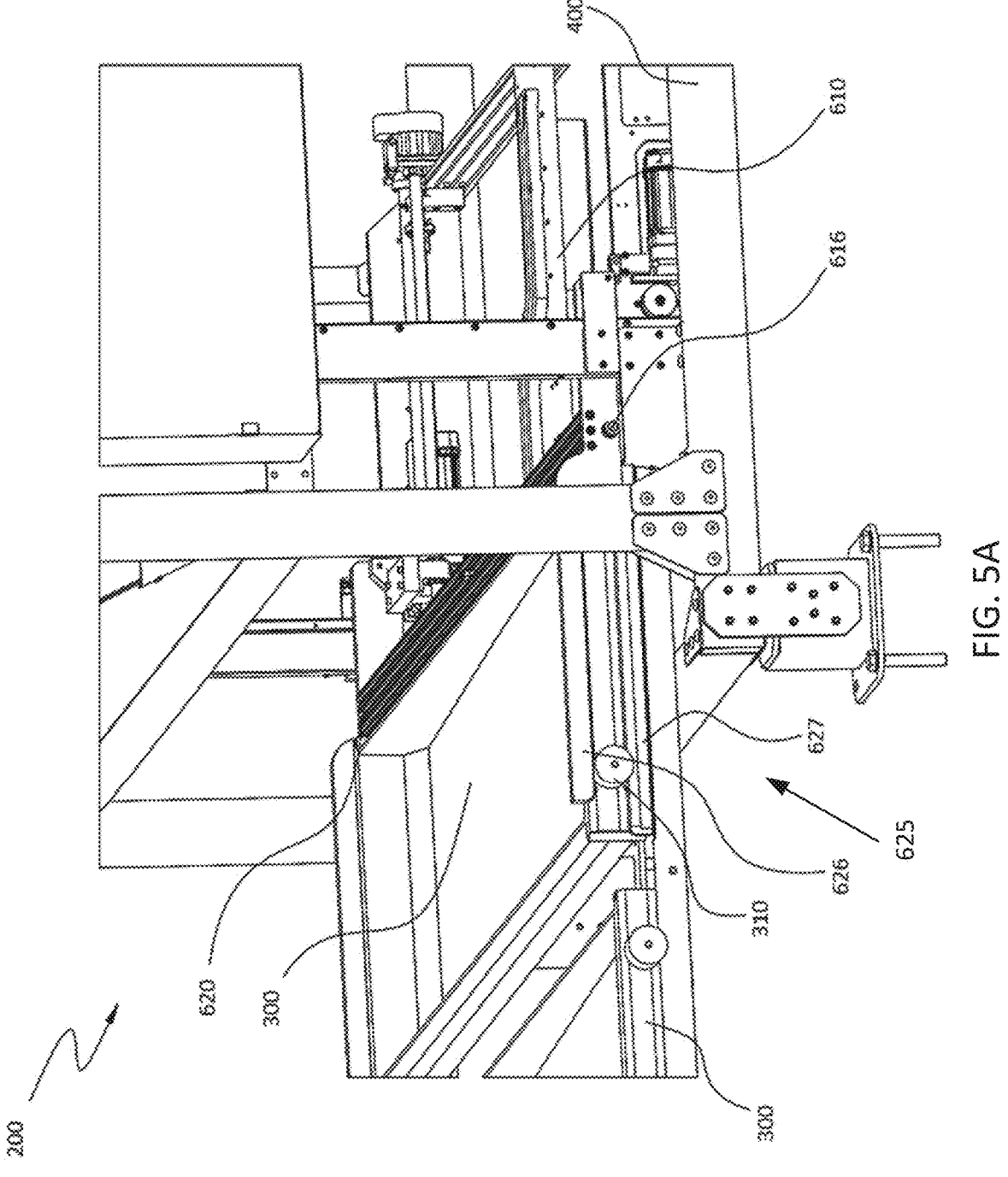
FIG. 5A depicts a raising lift mechanism of the modular grow tower assembly of FIG. 1 in an extended position according to one or more embodiments described herein.

The rail 620 may be further configured to move in a longitudinal direction between an extended position 612 and a retracted position 614. In the retracted position 614, the fork members 625 of the rail 620 may be contained within the space provided between the second supports 406 and the central supports 410 of the harvest frame 400. In the extended position 612, the forks may extend into the adjacent lift frame 200 to retrieve carts 300 from the end of the moving path. As illustrated in FIG. 5A, the fork members 625 of the raising lift mechanism 600 may extend from the harvest frame 400 and into lift frame 200 in order to engage carts 300 which have reached the end of the moving path.

Figure 5B:
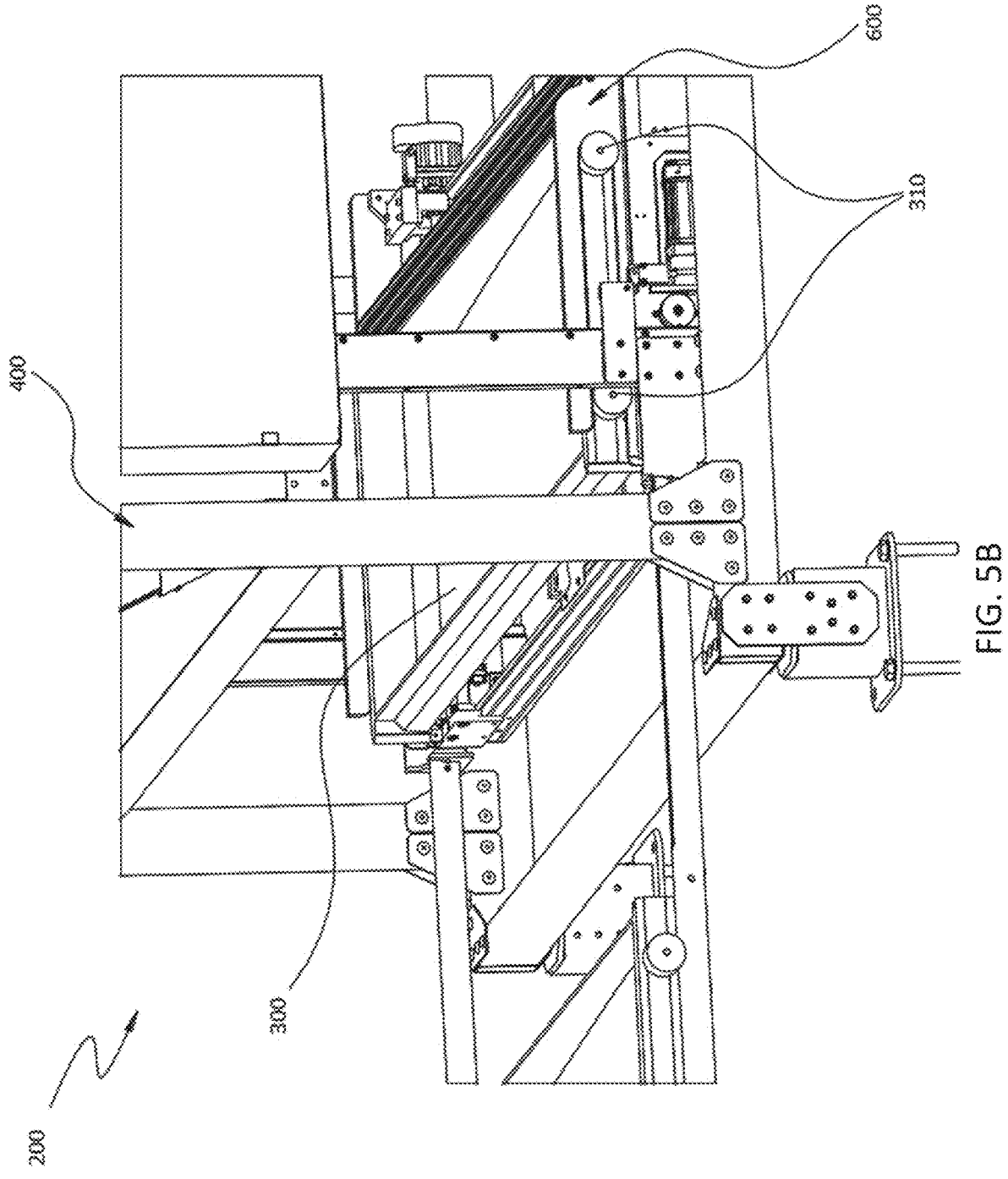
FIG. 5B depicts the raising lift mechanism of the modular grow tower assembly of FIG. 1 in a retracted position according to one or more embodiments described herein.

Referring still to FIG. 5A, as the rail 620 extends, the first fork 626 of the second fork 627 of the fork members 625 may engage the wheels 310 of the cart 300, such that when the rail 620 has achieved the extended position 612, the wheels 310 of the cart 300 may be completely secured between the first fork 626 and second fork 627 of the fork members 625. Once the wheels 310 are secured within the first fork 626 and second fork 627, the raising lift mechanism 600 may lift the cart 300 in a vertical direction to disengage the cart 300 from its adjacent cart 300. After the cart 300 is disengaged, the rail may return to the retracted position 614, such that the cart 300 is pulled into the harvest frame 400, as illustrated in FIG. 5B.

Figure 6:
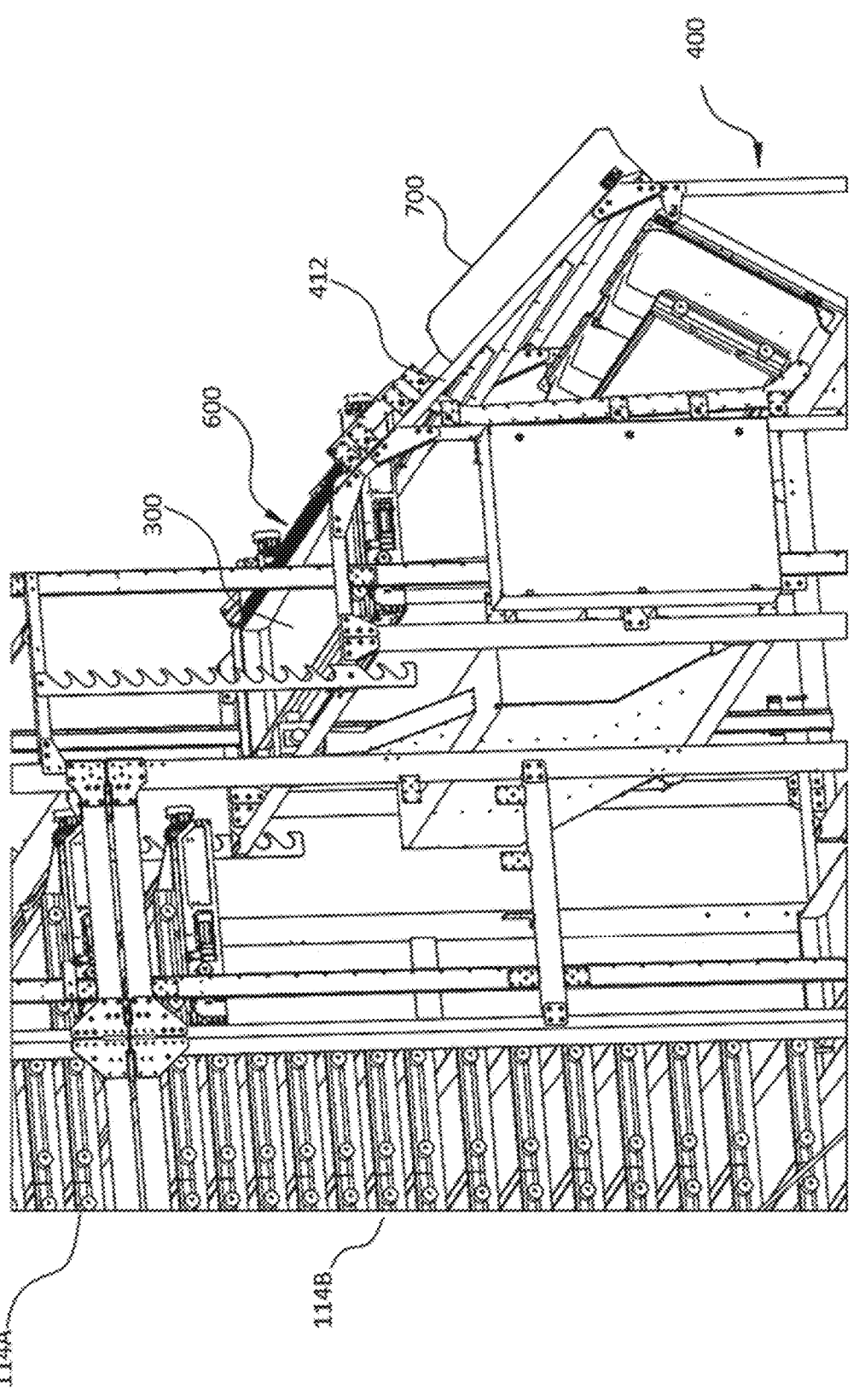
FIG. 6 depicts the raising lift mechanism in alignment with the harvest frame of the modular grow tower assembly of FIG. 1 according to one or more embodiments described herein.

Once the cart 300 is pulled into the harvest frame 400, the raising lift mechanism 600 may raise the cart 300 in a vertical direction to the top support 412 of the harvest frame 400, as illustrated in FIG. 6. When the raising lift mechanism 600 is aligned with the top support 412, the raising lift mechanism 600 may interact with the harvesting component 700 such that the crop materials in the cart 300 are harvested.

Figure 7:
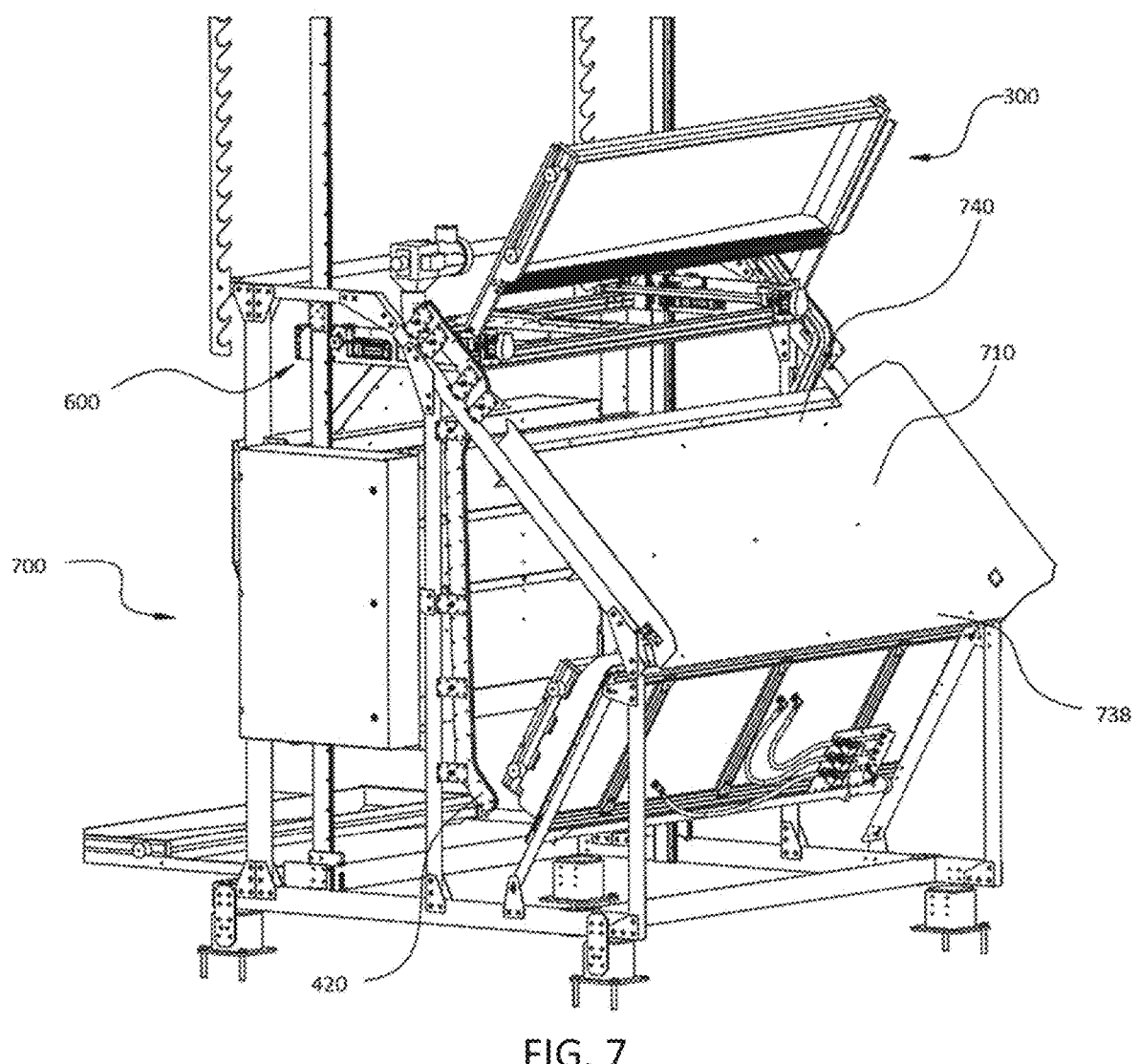
FIG. 7 depicts a harvesting component of the modular grow tower assembly of FIG. 1 according to one or more embodiments described herein.

The harvesting component 700 is most clearly illustrated in FIG. 7. As can be seen, the harvesting component 700 may comprise a tray 710 that is rotatably mounted within the harvesting component 700. Specifically, the tray 710 is positionable between a receiving position and a harvesting position. As shown in FIG. 7, the tray 710 of the harvesting component 700 is in the harvesting position such that a forward end 738 of the tray 710 is tilted lower than an opposite rearward end 740 of the tray 710. Additionally, the harvesting component may include guides 420 (FIG. 9), which may be used to engage the raising lift mechanism 600.

Figure 8:
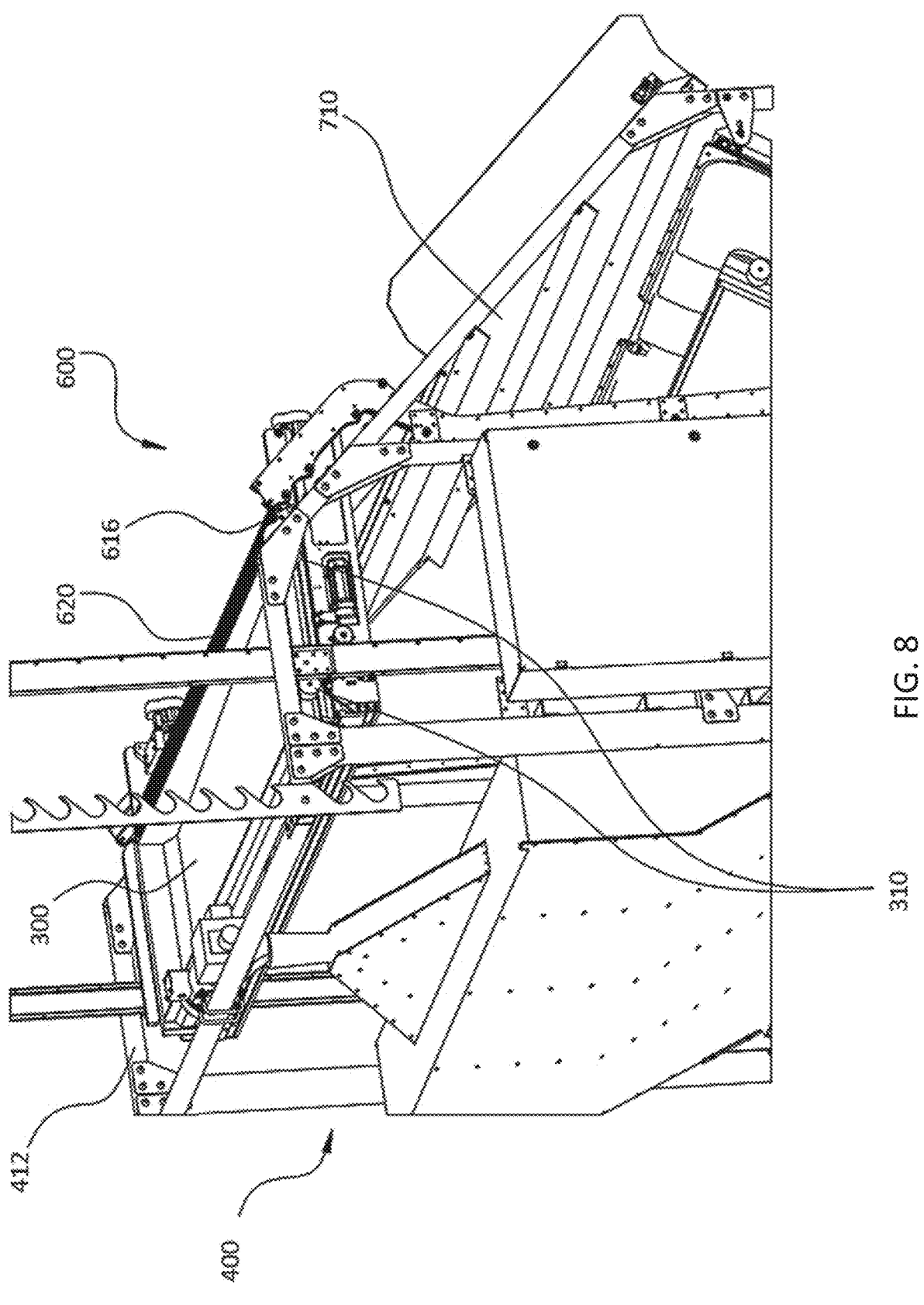
FIG. 8 depicts the raising lift mechanism engaging a guide of the harvest frame of the modular grow tower assembly of FIG. 1 according to one or more embodiments described herein.

Once the raising lift mechanism 600 has been raised to the top support 412 of the harvest frame 400, the rail 620 may retract such that the rollers 616 of the fork members 625 are received by the guides 420 of the harvesting component 700, as is illustrated in FIG. 8. With the rollers 616 secured in the guides 420, the raising lift mechanism may begin to move in a downward direction.

Figure 9:
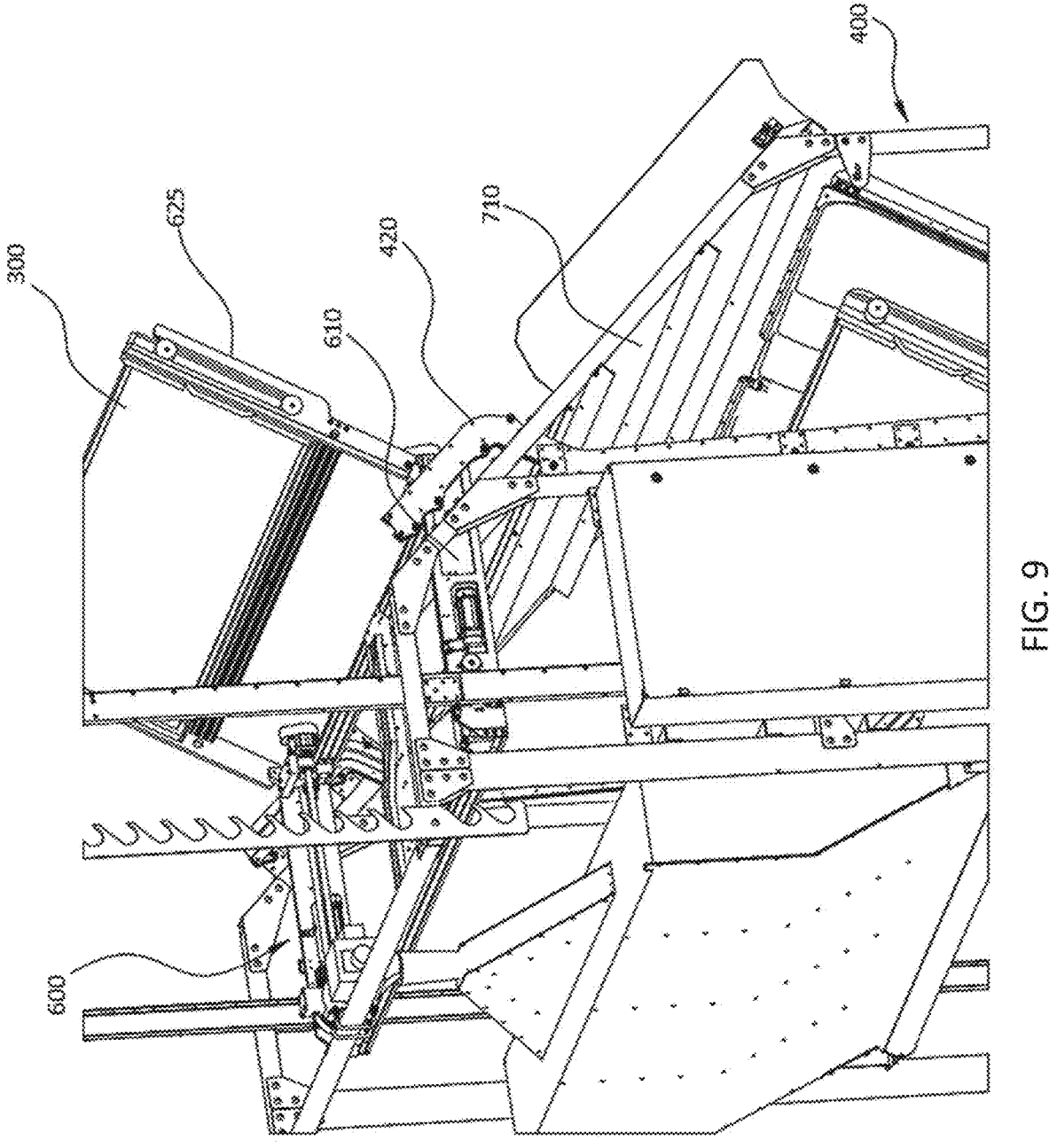
FIG. 9 depicts the raising lift mechanism overturning a cart for harvesting according to one or more embodiments described herein.

Turning now to FIG. 9, as the raising lift mechanism 600 moves downward in a vertical direction towards the base frame 402 of the harvest frame 400, the guides 420 may secure the rollers 616 such that the rail 620 rotates from the initial position to the rotated position. As the raising lift mechanism 600 moves in the downward direction, the guides 420 of the harvesting component 700 ensure that the cart 300 secured by the raising lift mechanism remains at the appropriate angle for harvesting crop materials whenever the cart 300 reaches the harvesting tray 710.

It should be noted that, as the carts 300 traverse the modular grow tower assembly 100, a current growth, a current development, and/or a current output of crops may be detected and may determine when harvesting is warranted. If harvesting is warranted prior to the cart 300 reaching the harvesting component 700, modifications to a crop material recipe may be made for that particular cart 300 until the cart 300 reaches the harvesting component 700. Conversely, if a cart 300 reaches the harvesting component 700 and it has been determined that the crops in that cart 300 are not ready for harvesting, that cart 300 may be commissioned for another lap through the modular grow tower assembly 100. This additional lap may include a different dosing of light, water, nutrients, etc. and the speed of the cart 300 could change, based on the development of the crops on the cart 300. If it is determined that the crops on a cart 300 are ready for harvesting, the harvesting component 700 may facilitate that process.

Figure 10:
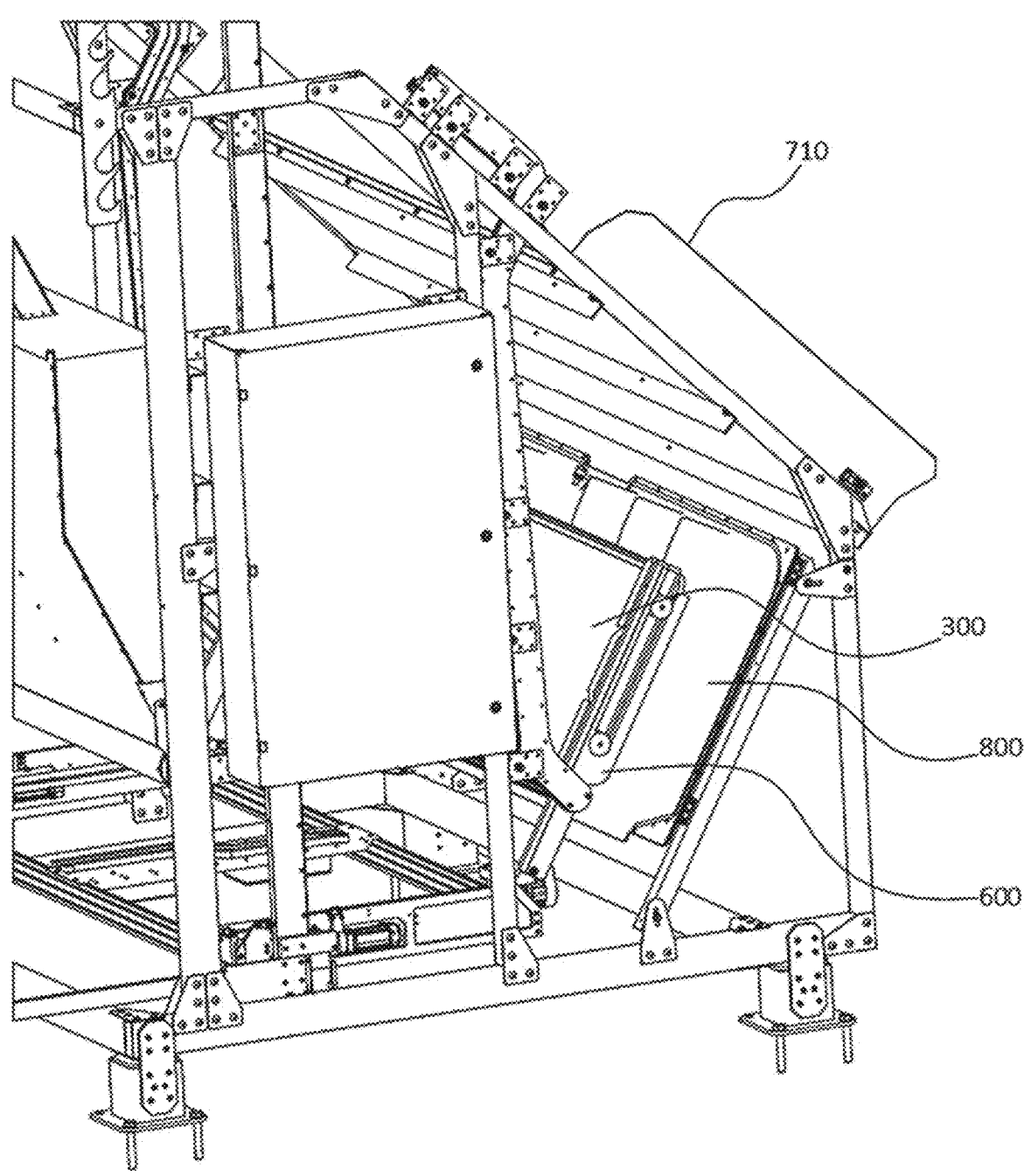
FIG. 10 depicts the raising lift mechanism engaging a sanitation component of the modular grow tower assembly of FIG. 1 according to one or more embodiments described herein.

Once the cart 300 has emptied its crop material onto the harvest tray 710, the raising lift mechanism 600 may continue to move in a downward direction toward the base frame 402 of the harvest frame 400. In these embodiments, the guides 420 may continue to support the rollers 616 of the raising lift mechanism 600 as the raising lift mechanism 600 moves in a downward direction below the harvesting component 700, such that the cart 300 remains at an appropriate angle for interfacing with the sanitation component 800, as is illustrated in FIG. 10. The sanitation component 800 may be implemented to remove any particulate, crop material, etc. that may remain on the cart 300 after harvesting. As such, the sanitation component 800 may implement any of a plurality of different washing mechanisms, such as high pressure water, high temperature water, and/or other solutions for cleaning the cart 300.

In some embodiments, the sanitation component 800 may receive a cart 300 that has been overturned by the guides 420 of the harvesting component. In other embodiments, it is further contemplated that the sanitation component 800 may be configured to overturn the cart 300 itself. As described above, some embodiments may be configured such that the raising lift mechanism 600 overturns carts 300 and, as such, the carts 300 may remain in that position when entering the sanitation component 800. Regardless, the sanitation component 800 may clean and/or otherwise sanitize the cart 300 such that the cart 300 is prepared for receiving new crop material. Additionally, in some embodiments, the sanitation component 800 may include one or more sensors for determining the cleanliness of the cart 300. If the sanitation component 800 does not clean the cart 300 to a predetermined threshold, the master controller 20 may determine whether the cart is able to be cleaned to meet the threshold. If so, the cart 300 may be rerun through the sanitation component. In some embodiments, the cart 300 may simply remain in the sanitation component 800 while this determination and re-cleaning occur.

After the cart 300 has been effectively cleaned, the raising lift mechanism 600 may continue to move in a downward direction towards the base frame 402 of the harvest frame 400 until the rollers 616 of the raising lift mechanism 600 are no longer restricted by the guides 420. At this point, the rail 620 may be rotated to the initial position. In this position, the raising lift mechanism 600 may be located adjacent to the base frame 402 of the harvest frame 400, and the fork members 625 of the raising lift mechanism 600 may remain engaged with the cart 300 which has been sanitized.

Figure 11:
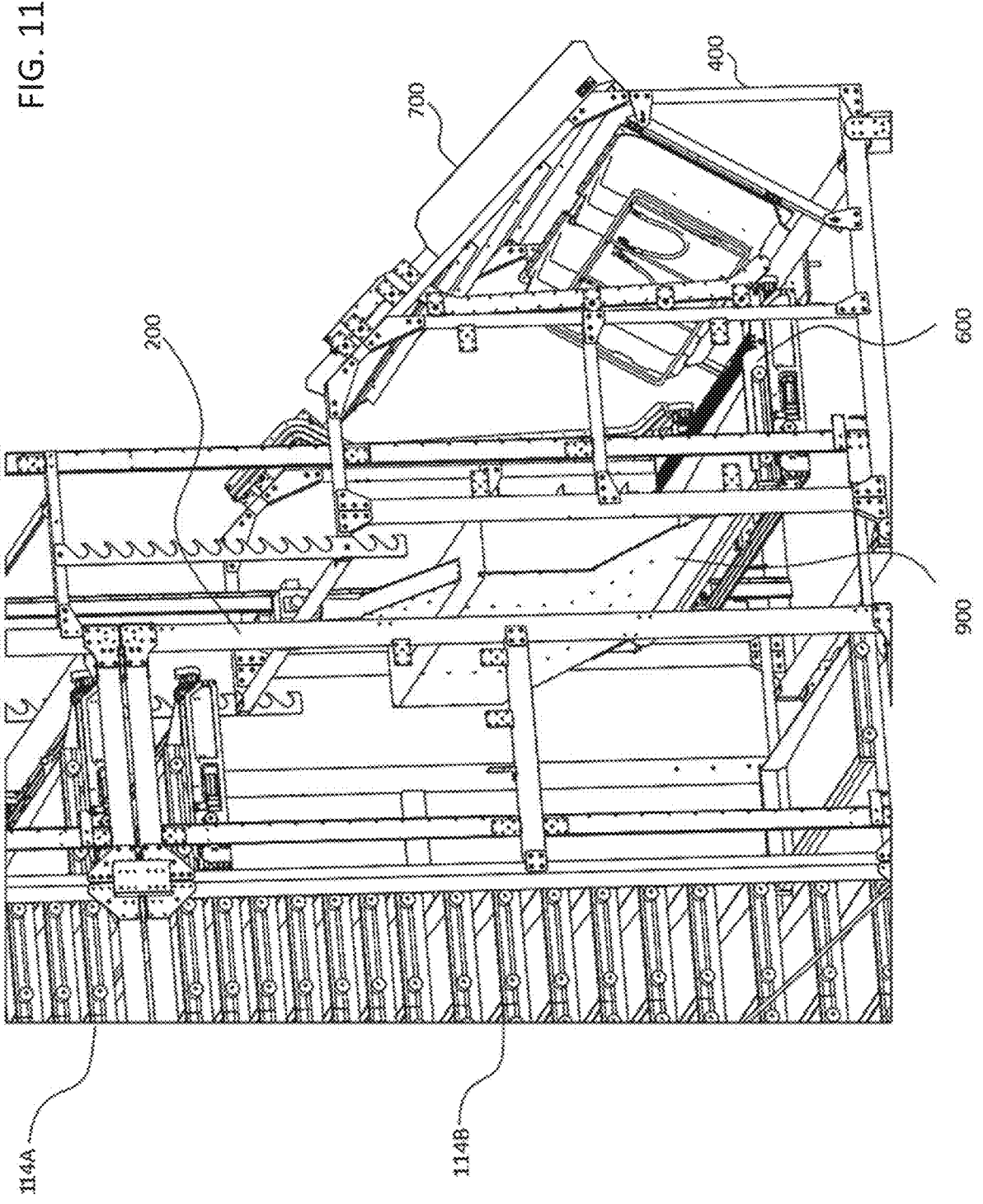
FIG. 11 depicts the raising lift mechanism engaging a seeding component of the modular grow tower assembly of FIG. 1 according to one or more embodiments described herein.

At this point, the sanitized cart 300 may be prepared to receive new crop matter and reenter the modular grow tower assembly 100. In some embodiments, the raising lift mechanism 600 may raise the sanitized cart 300 such that it is elevated above the harvest frame 400, as is illustrated in FIG. 11. In this embodiment, the raising lift mechanism 600 may traverse the outside of the lift frame 200 located in the row 114 above the harvest frame 400. As further illustrated in FIG. 11, the raising lift mechanism 600 may be lifted above the harvest frame 400 such that the raising lift mechanism 600 is aligned with the lift frame 200, which is located in row 114a. In some embodiments, the raising lift mechanism 600 may be configured to be lifted until it reaches the seeding component 900. In embodiments which include multiple rows 114, such as the embodiment illustrated in FIG. 1, the seeding component 900 may be mounted to the lift frame 200 located on the highest row 114a of the modular grow tower assembly 100 on the same side of the modular grow tower assembly where the harvest frame 400 is located. The seeding component 900 may be mounted to the lift frame 200 such that the seeding component does not extend above the top end 106 of the modular grow tower assembly 100.

In various embodiments, the raising lift mechanisms 600 may be powered via pneumatic arms and/or motors, such as a plurality of translating mechanisms positioned along a length of a track, where each translating mechanism has a plurality of motorized apparatuses (e.g., motors) configured to push or pull the carts in a longitudinal direction. Correspondingly, the motorized apparatuses may be configured to push and retrieve the carts using extendable and retractable mechanical mechanisms to move the carts a predetermined length. In various embodiments, such motorized apparatus may be comprise one or more of motors, belts, chains, rollers, tracks, conveyers, rack and pinion gears, hydraulic systems, pneumatic systems, linear actuators, screw jacks, winches, cables and pulleys, gear systems, cam mechanisms, scissor lifts, and/or magnetic levitation systems.

Figure 12:
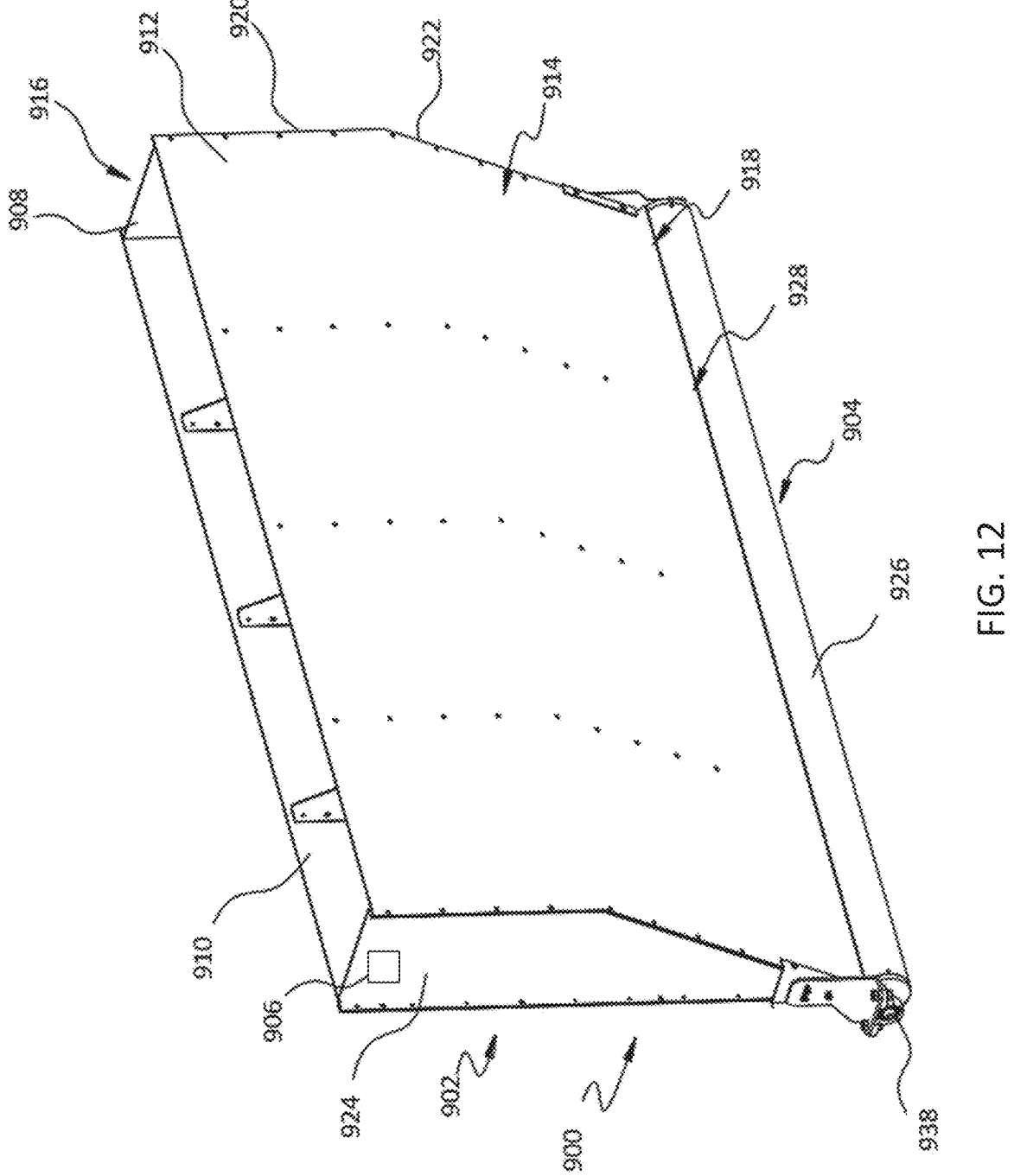
FIG. 12 depicts the seeding component of the modular grow tower assembly of FIG. 1 according to one or more embodiments described herein.

The seeding component 900 may be configured to provide crop material, for example, plant seeds, eggs, insects, or the like to one or more carts 300 as the carts 300 pass the seeding component 900, as illustrated in FIG. 12. The crop material may be laid out according to a desired depth of crop material, a desired quantity of crop material, a desired surface area of crop material, and/or according to other criteria. In some embodiments, the crop material may be pre-treated with nutrients and/or anti-buoyancy agents, such as water, as these embodiments may not utilize soil to grow the crop material.

Referring still to FIG. 12, the seeding component 900 may generally include a dispenser 902 and a drum 904 rotatably mounted to the dispenser 902. The dispenser 902 includes a first end wall 906, a second end wall 908 opposite the first end wall 906, a first side wall 910, and a second side wall 912 opposite the first side wall 910. The first side wall 910 and the second side wall 912 extend between the first end wall 906 and the second end wall 908 and define an open interior 914. The dispenser 902 has an open top end 916, through which crop material enters the open interior 914, and an open bottom end 918, through which crop material is dispensed out of the open interior 914. The dispenser 902 has a length defined by a distance between the first end wall 906 and the second end wall 908, a width defined by a distance between the first side wall 910 and the second side wall 912, and a height defined by a distance between the open bottom end 918 and the open top end 916. As discussed herein, the width of the dispenser 902 along the height of the dispenser 902 may not be constant. In embodiments, the second side wall 912 of the dispenser 902 has a vertical wall portion 920 and an angled wall portion 922 relative to the vertical wall portion 920. The vertical wall portion 920 may extend parallel to the first side wall 910 and the angled wall portion 922 may extend toward the first side wall 910 such that the open bottom end 918 has a width extending between the first side wall 910 and the second side wall 912 that is less than a width of the open top end 916. Accordingly, crop material entering the dispenser 902 contacts the angled wall portion 922 to accumulate at the open bottom end 918. The dispenser 902 may include a sensor 924 for detecting an amount of crop material within the dispenser 902. In embodiments, the sensor 924 is located proximate the open top end 916 of the dispenser 902 to detect when the level of crop material reaches a predetermined height within the open interior 914.

The drum 904 has an outer surface 926 that contacts seed falling through the open bottom end 918 of the dispenser 902. In embodiments, the outer surface 926 of the drum 904 is cylindrical. The drum 904 may also have a length extending along the entire open bottom end 918 of the dispenser 902 such that the length of the drum 904 is equal to a length of the dispenser 902 extending between the first end wall 906 and the second end wall 908. It should be appreciated that the drum 904 may be configured as a substantially cylindrical member rotatably mounted at the open lower end of the dispenser 902 in a spaced apart manner so as to provide a gap 928 between the open lower end and the drum 904, defined by a distance between the drum 904 and the angled wall portion 922 of the dispenser 902. A motor 938 is provided at an end of the drum 904.

Figure 13:
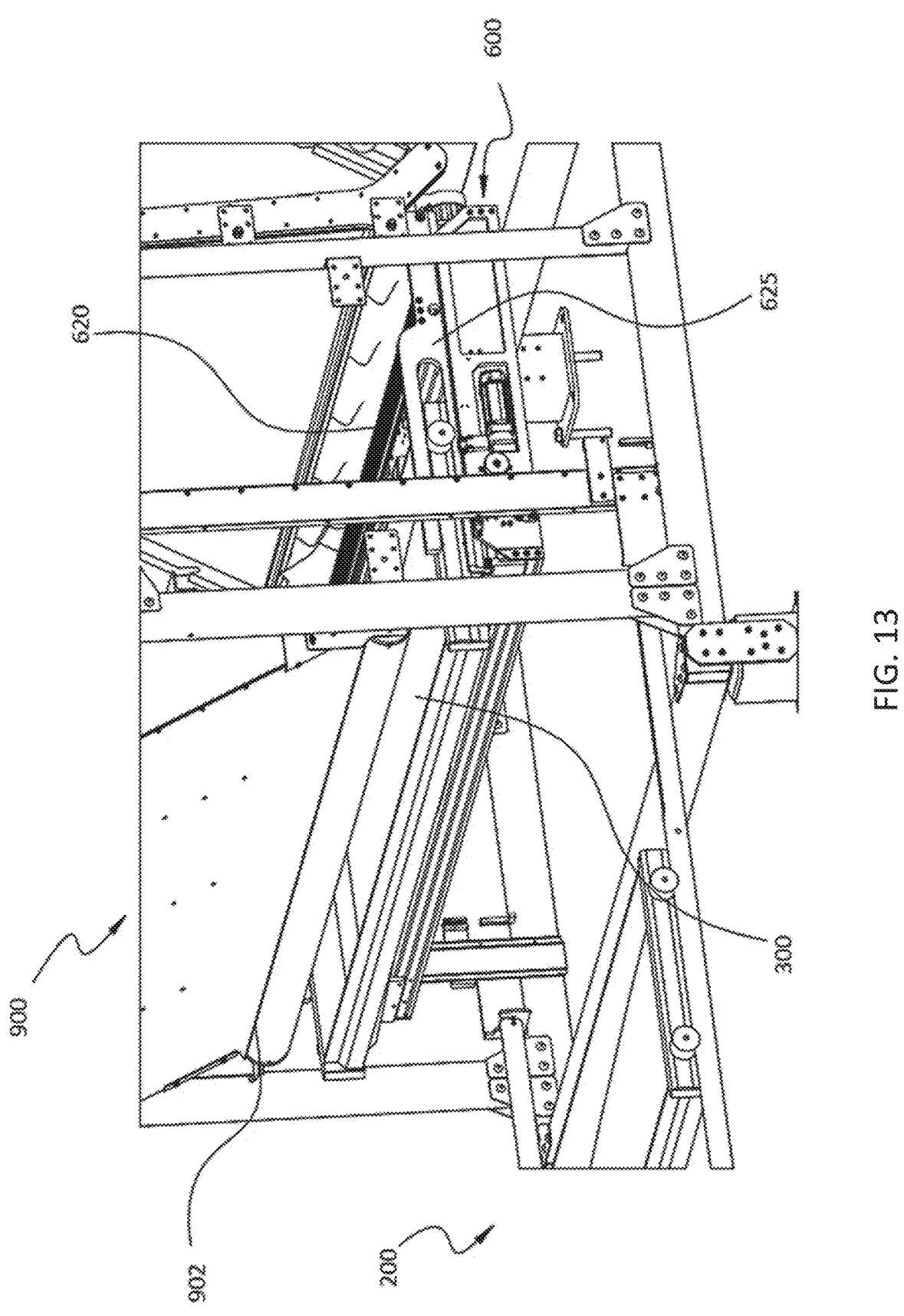
FIG. 13 depicts the raising lift mechanism in an extended position beneath a seeding component of the modular grow tower assembly of FIG. 1 according to one or more embodiments described herein.

As previously described, the raising lift mechanism 600 may be raised from the base frame 402 of the harvest frame 400 until the sanitized cart 300 secured by the raising lift mechanism 600 is aligned with the dispenser 902 of the seeding component 900. Once the raising lift mechanism 600 is properly positioned, the rail 620 may extend to the extended position 612 (FIG. 4), as is illustrated in FIG. 13. As the rail 620 extends, the cart 300 may pass under the dispenser 902 of the seeding component 900, which may provide new crop material to the cart 300.

As the rail 620 continues to extend, the cart 300 will pass into the lift frame 200 on which the seeding component 900 is mounted. For example, in the embodiment illustrated in FIG. 1, the cart 300 may receive crop material from the seeding component 900 as the rail 620 extends to the extended position 612, such that the cart 300 is extended into the lift frame 200 once the rail 620 achieves the extended position 612.

Once the rail 620 of the raising lift mechanism 600 is in the extended position 612, the cart 300 may be fully contained within the lift frame 200 upon which the seeding component 900 is mounted. At this point, the seeded cart 300 may be transferred from the raising lift mechanism 600 such that the seeded cart may be reinserted into the modular grow tower assembly 100.

As discussed previously, the motion of carts does not need to follow a serpentine path nor is it limited to one set sequence. One possible method of moving carts in a modular grow tower assembly may be alternating which row carts are moved to, in a non-sequential or non-serpentine path. This alternating method only moves carts when necessary, to designated new rows of the modular grow tower assembly, based on specific growing requirements such as crop height, row spacing, lighting elements, nutrient application systems, visual inspections, harvesting, and/or washing. This method optimizes the movement of carts by reducing the overall motion required and consequently minimizing wear on the carts and the need for an extensive motion system.

In various embodiments, the alternating rows method is controlled by a computer program executed by the master controller that dictates the sequence of cart movements based on specific growing requirements. For instance, the system can start by moving a cart from the top row to row A, and in the next cycle, move another cart from the top row to row B. This sequence can be customized to suit various growing conditions, ensuring that carts are moved efficiently and only when necessary.

Such a method allows for grouping certain rows together and alternating the movement of these groups. For example, the system can alternate between moving carts in rows A, C, and E in one cycle and rows B, D, and F in the next cycle. Another possibility is moving carts from row A to C in one cycle, then only move carts from rows B to D in the next. Another possibility is moving carts from rows A, B, and C to the next level of rows D, E, and F or even to the bottom rows, for the sake of example could be labeled X, Y, and Z. This reduces the overall motion required during an entire grow cycle of a crop from start to finish, thereby lowering the wear on the carts and minimizing the demand on the lift mechanisms.

Another option, in various embodiments, is allowing different rows of carts to be consolidated together into one entirely new row, and another possibility is individual carts can alternately be sent to a different row during a movement cycle. This is particularly useful when rows are spaced at different heights, and therefore accommodate continually growing crops. Another possible benefit is minimizing the cost of lighting systems by only requiring lighting on one or two rows. There are many other reasons to justify providing flexibility of cart paths and allowing consolidating rows. Accordingly, alternating and shuffling carts and rows can be performed in a large variety of ways in accordance with the present disclosure.

In various embodiments, the non-sequential movement of the carts is controlled by a computer program executed by the master controller, which dictates the cart movement sequence based on the specific growing requirements. This sequence can be customized in other variations to suit various growing conditions, grow times of different crops, reducing the frequency of cart movements and enhancing system efficiency. Correspondingly, a cart tracking system of sensors can allow the master controller to keep track of the location of each cart and monitor the growing properties of the crops inside each cart. In various embodiments, the master controller can also be configured to allow users to test and predict different patterns of cart movements to discover optimal cart pathways and patterns.

Figure 14:
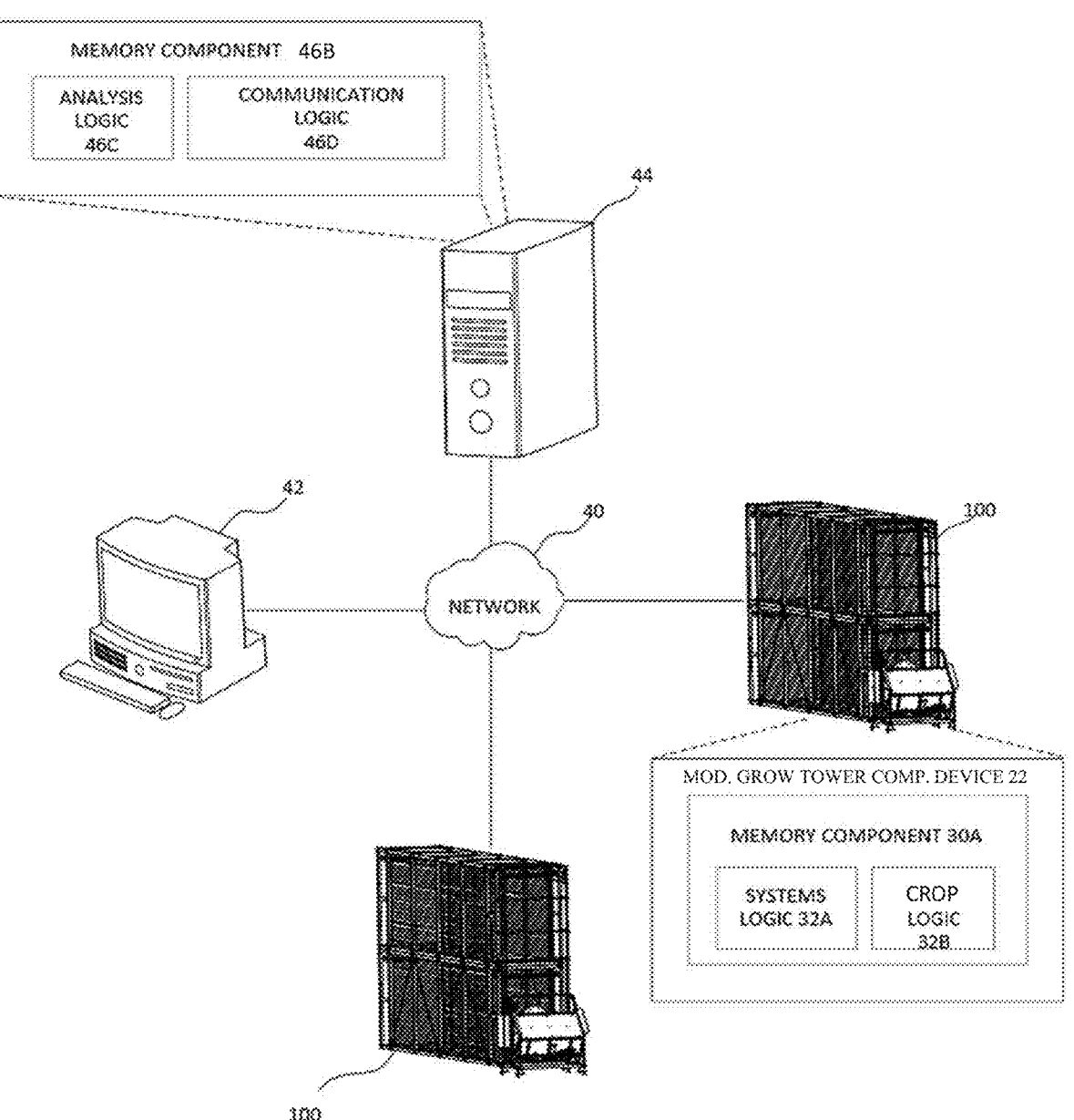
FIG. 14 depicts a computing environment for providing a modular grow tower assembly according to one or more embodiments described herein.
Figure 15:
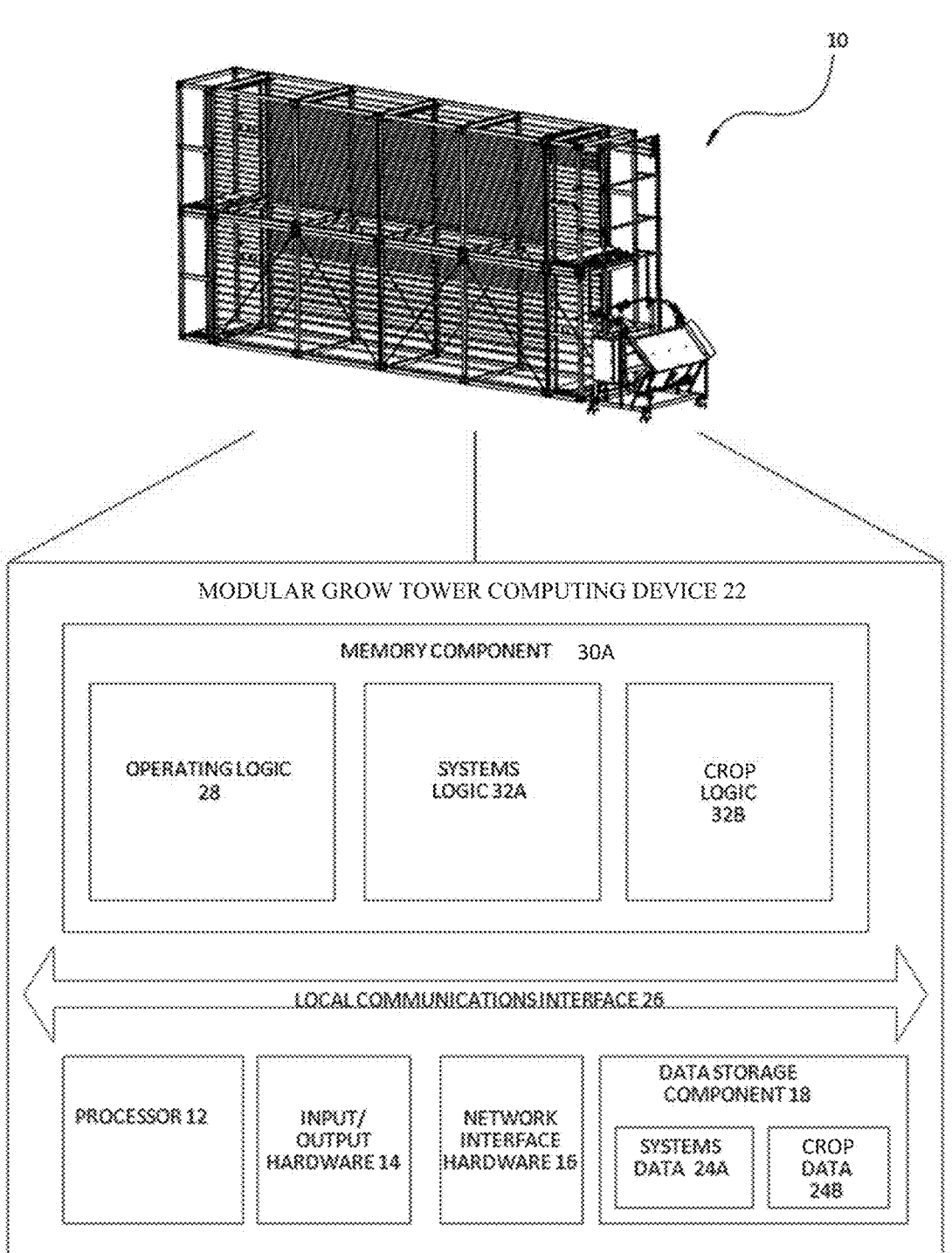
FIG. 15 depicts an exemplary modular grow tower computing device according to one or more embodiments described herein.

Turning now to FIGS. 14 and 15, a computing environment for providing a modular grow tower assembly 100, may also be provided. As described above, the modular grow tower assembly 100 may include a master controller, which may be provided by the modular grow tower computing device 22. The modular grow tower computing device 22 may include a memory component 30A, which stores systems logic 32A and crop logic 32B. The systems logic 32A may monitor and control operations of one or more of the components of the modular grow tower assembly 100; may provide one or more user interfaces; and/or may otherwise cause the modular grow tower assembly 100 to perform the functionality provided herein. As an example, the systems logic 32A may cause actuation of one or more hardware components of the modular grow tower assembly 100; receive and/or determine updates, upgrades, or adjustments to current grow recipes; receive new grow recipes, and/or otherwise control operations of the modular grow tower assembly 100. The crop logic 32B may be configured to determine crop growth and may facilitate implementation of the grow recipe via the systems logic 32A.

In various embodiments, the modular grow tower computing device 22 (e.g., master controller device) or other component of the computing environment can monitor and measure sensor data, growth parameters, or other environmental factors, such as, but not limited to, temperature, humidity, light intensity, light duration, light spectrum, water quality/purity, water quantity, watering frequency, water temperature, water polarization, water flow rate, water filtration system efficiency, water mineral content, nutrient concentration, nutrient composition, pH level, airflow, $CO_2$ concentration, soil type, soil moisture, soil pH, soil composition, tray size and shape, tray material, growth medium, plant density, genetic factors, pollination, growth stage, harvest timing, microbial activity, oxygen levels, feeding frequency (for insects and larvae), substrate type (for fungus), light-dark cycles, movement frequency, sound vibrations, structural support (stakes, netting, cages, trellis, etc.), climatic conditions, altitude/barometric pressure, cleaning/washing/sanitizing/hygiene practices, growth hormones, symbiotic relationships if different crops are mixed, different crop or seed varieties in one tray, amount of human contact, pre-planting treatments or coatings applied to seeds, crop harvest weight, crop color, crop uniformity, crop density, crop level, nutrient content of crop harvests, and/or elemental analysis of crop harvests.

Additional factors that can be measured and/or used to customize tower operations include cart paths, cart maintenance reports, total electricity use, total water use, total seed or crop-starting material amount or weight, total time of carts in motion, total downtime of no motion, maintenance history, usage history, change history, video monitoring of individual systems, video monitoring of facility, user logs, software update history, bug reports, weather, and/or user notes.

Additionally, the modular grow tower assembly 100 may be coupled to a network 40. The network 40 may include the internet or other wide area network, a local network, such as a local area network, a near field network, and/or a peer-to-peer network, such as via Bluetooth or a near field communication (NFC) network. The network 40 is also coupled to a user computing device 42, a remote computing device 44, and/or another modular grow tower assembly 100 having a tower computing device, similar to the modular grow tower computing device 22. The user computing device 42 may be configured as a personal computer, laptop, mobile device, tablet, server, etc. and may be utilized as an interface through which a user may interact with one or more devices depicted in FIG. 1. In some embodiments, the remote computing device 44 may send a grow recipe to the tower computing device 22 for implementation by the modular grow tower assembly 100. The modular grow tower assembly 100 may then send notification to a user of the user computing device 42.

The remote computing device 44 may be configured as a server, personal computer, tablet, mobile device, etc. and may be utilized for machine to machine communications. Accordingly, the remote computing device 44 may include a memory component 46B. The memory component 46B may store analysis logic 46C and communication logic 46*d*. The analysis logic 46C may be configured to receive a grow recipe, determine updates, upgrades, and/or adjustments to a grow recipe and determine differences between the grow recipe received and the current grow recipe that is stored by the remote computing device 44. The remote computing device 44 may alter a stored grow recipe and/or save the received grow recipe for communicating the update, upgrade or adjustment to another modular grow tower assembly 100 via the communication logic 46*d*.

FIG. 14 depicts a tower computing device 22, according to embodiments described herein. As discussed above, the tower computing device 22 includes a memory component 30A, a processor 12, input/output hardware 14, network interface hardware 16, and a data storage component 18 (which stores systems data 24A, crop data 24B, and/or other data). Each of the components of the tower computing device 22 may be communicatively coupled to a local communications interface 26. The local communications interface 26 is generally not limited by the present disclosure and may be implemented as a bus or other communications interface to facilitate communication among the components of the master controller coupled thereto.

The memory component 30A may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within or outside the tower computing device 22. The memory component 30A may store, for example, operating logic 28, the systems logic 32A, and the crop logic 32B. The operating logic 28, the systems logic 32A and the crop logic 32B may each include a plurality of different pieces of logic, each of which may be embodied as a computer program, firmware, and/or hardware, as an example.

The operating logic 28 may include an operating system and/or other software for managing components of the tower computing device 22. As discussed above, the systems logic 32A and the crop logic 32B may reside in the memory component 30A and may be configured to perform the functionality, as described above. In some embodiments, the systems logic 32A and the crop logic 32B may reside on different computing devices. As an example, one or more of the functionalities and/or components described herein may be provided by the user computing device 42 and/or remote computing device 44. While the tower computing device 22 is illustrated with the systems logic 32A and the crop logic 32B as separate logical components, this is only an example. In some embodiments, a single piece of logic (and/or or several linked modules) may cause the tower computing device 22 to provide the described functionality.

The processor 12 may include any processing component operable to receive and execute instructions (such as from the data storage component 18 and/or the memory component 30A). Illustrative examples of the processor 12 include, but are not limited to, a computer processing unit (CPU), a many integrated core (MIC) processing device, an accelerated processing unit (APU), a digital signal processor (DSP). In some embodiments, the processor 12 may be a plurality of components that function together to provide processing capabilities, such as integrated circuits (including field programmable gate arrays (FPGA)) and the like.

The input/output hardware 14 may include and/or be configured to interface with microphones, speakers, a display, and/or other hardware. That is, the input/output hardware 14 may interface with hardware that provides a user interface or the like. The user interface may include a graphical user interface (GUI) comprising various interactive elements such as buttons, menus, display graphs, icons, sliders, and text fields. The GUI is designed to facilitate user interaction with the system, providing visual representations of data and controls to improve the overall usability and efficiency of the system. The graphical elements may be arranged in a layout that is intuitive and accessible, allowing users to navigate the interface and perform desired actions with ease.

The network interface hardware 16 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the tower computing device 22 and other computing devices, such as the user computing device 42, the remote computing device 44, and/or other devices.

The data storage component 18 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 18 may reside local to and/or remote from the tower computing device 22 and may be configured to store one or more pieces of data and selectively provide access to the one or more pieces of data.

It should be understood that while the components in FIG. 16 are illustrated as residing within the tower computing device 22, this is merely an example. In some embodiments, one or more of the components may reside external to the tower computing device 22. It should also be understood that, while the tower computing device 22 is illustrated as a single device, this is also merely an example. That is, the tower computing device 22 may represent a plurality of devices that are communicatively coupled to one another and provide the functionality described herein.

Additionally, while the tower computing device 22 is illustrated with the various logic components (e.g., the operating logic 28, the systems logic 32A, and the crop logic 32B) and data components (e.g., the systems data 24A and the crop data 24B) as separate components, this is also an example. In some embodiments, a single piece of logic (and/or a plurality of linked modules) and/or a single data component (and/or a plurality of linked modules) may also cause the tower computing device 22 to provide the functionality described herein.

Similarly, while the tower computing device 22 is depicted in a "PC" environment, it should be understood that at least some embodiments may not be limited in this way. Specifically, some embodiments may be configured such that the tower computing device 22 is configured as and/or includes a programmable logic controller (PLC) and/or other computing infrastructure. To the extent that the modular grow tower assembly 100 utilizes a PLC, appropriate equivalents of the components described with reference to FIGS. 14 and 15 may be utilized.

From the above, it is to be appreciated that defined herein is a system and method for raising carts in a modular grow tower system, including a raising lift mechanism configured to pull carts from a body frame, transport carts to a harvesting component and a sanitizing component, and reinsert carts into the modular grow tower system.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for raising a cart in a modular grow tower assembly, comprising:
   a modular grow tower assembly including a plurality of body frames and a plurality of lift frames, the body frames configured to support a plurality of carts moving along a path from a top end to a bottom end of the modular grow tower assembly;
   a harvest frame positioned adjacent to one of the lift frames, the harvest frame including a rectangular base frame, vertical supports, and a top support;
   a raising lift mechanism configured to pull a cart from the modular grow tower assembly into the harvest frame, the raising lift mechanism comprising a base frame, a rail with fork members, and rollers, wherein the rail is rotatably and longitudinally movable between an extended position and a retracted position, and the fork members are configured to engage wheels of the cart; and
   wherein the raising lift mechanism is further configured to move vertically within the harvest frame to position the cart for subsequent harvesting, sanitizing, seeding, and reinsertion into the modular grow tower assembly.

2. The system of claim 1, wherein the raising lift mechanism is configured to rotate about a z-axis to overturn the cart for harvesting, sanitizing, and/or seeding.

3. The system of claim 1, further comprising a harvesting component with a tray rotatably mounted within the harvest frame, the tray being positionable between a receiving position and a harvesting position.

4. The system of claim 1, further comprising a controller configured to detect if crop materials in the cart are ready for harvesting and adjusting movement of the cart and/or lighting, watering, nutrient delivery, and/or growth conditions of the crop material based on the detected readiness.

5. The system of claim 1, wherein the path comprises a serpentine path.

* * * * *